United States Patent [19]

Kettlety et al.

[11] Patent Number: 4,867,870
[45] Date of Patent: Sep. 19, 1989

[54] APPARATUS FOR SPRAY SHOWER MAINTENANCE

[75] Inventors: Richard A. Kettlety, Covington; James P. Peters, Jr., Goshen, both of Va.

[73] Assignee: Westvaco Corporation, New York, N.Y.

[21] Appl. No.: 211,869

[22] Filed: Jun. 27, 1988

[51] Int. Cl.⁴ ........................ B01D 21/30; B01D 35/16
[52] U.S. Cl. .................................... 210/139; 210/393; 210/394; 210/411; 239/116; 15/104.05; 15/104.1 R
[58] Field of Search ................ 210/784, 791, 798, 139, 210/140, 393, 394, 138, 396, 408, 411; 239/114, 116, 123, 104, 106; 162/199, 272, 276, 60; 15/104.1 R, 104.05

[56] References Cited

U.S. PATENT DOCUMENTS

| | | | |
|---|---|---|---|
| 1,019,013 | 3/1912 | Baker et al. | 239/116 |
| 1,972,001 | 8/1934 | Witham et al. | 239/123 |
| 2,283,768 | 5/1942 | Schueler | 239/59 |
| 2,536,946 | 1/1951 | Larson | 239/116 |
| 2,784,032 | 3/1957 | Johansson | 239/116 |
| 3,979,289 | 9/1976 | Bykowski et al. | 210/79 |
| 4,634,537 | 1/1987 | Schreiber | 210/784 |

*Primary Examiner*—W. Gary Jones
*Assistant Examiner*—Matthew O. Savage
*Attorney, Agent, or Firm*—W. A. Marcontell; R. L. Schmalz

[57] ABSTRACT

Screen cleaning showers for a sludge dewatering rotary screen thickener are kept open and effective by periodically rotating a steel wire brush positioned coaxially within the cleaning shower manifold. Shower nozzles are set into the manifold to assure full mechanical wiping of a nozzle interior surface by the axially rotating brush bristles. Brush rotation is motor driven. An automatic controller periodically and simultaneously rotates the nozzle cleaning brush and opens a normally closed solenoid valve in the shower manifold drain line.

2 Claims, 1 Drawing Sheet

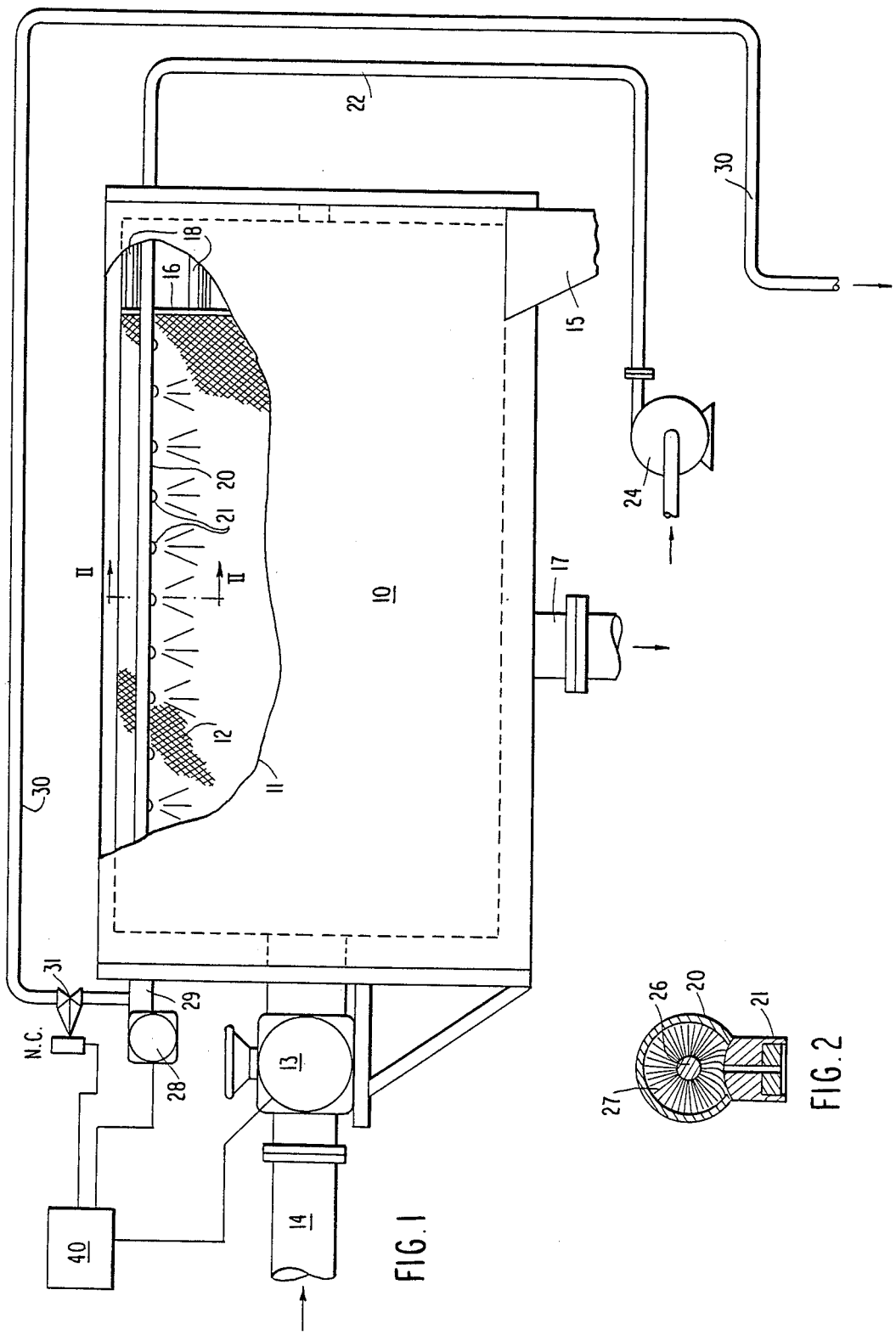

APPARATUS FOR SPRAY SHOWER MAINTENANCE

BACKGROUND OF THE INVENTION

1. Field of the Invention

The present invention relates to procedures and equipment for maintaining waste water treatment systems. In particular, the present invention relates to an apparatus for maintaining the operating effectiveness and efficiency of a rotary screen thickener cleaning shower.

2. Description of the Prior Art

Rotary screen thickeners are devices for primary separation of water and solids from a waste water treatment facility. Influent to a rotary screen thickener is a pumpable, 3 to 10 percent solids consistency, sludge from the bottom of a settling basin. To further increase the solids content of the sludge, water is removed through the mesh openings of a finely woven screen. Particulate solids larger than the mesh openings are retained on the screen surface.

These screens are formed as cylindrical walls about a circular framework that is rotatively driven about a cylindrical axis. A ribbon baffle helically follows the inner screen surface to advance the sludge flow along the cylinder from the influent to discharge ends as the cylinder rotates. At the discharge end, the cylinder wall is open to permit the thickened sludge to fall into a funnel opening through the outer shell of the unit.

To keep the screen openings clear of accumulated fiber and particulates, the screen is showered with water: frequently from a recycle tank. Although recycled shower water is burdened with substantially less particulate matter than the influent sludge, recycle water still has a significant solids and fibrous content. This residual solid and fiber tends to obstruct the shower orifices at the nozzle entrance inside the shower distribution manifold.

In anticipation of this operational difficulty, brushes have been integrated with the shower manifold assembly having bristles projecting radially from an axially positioned rod which extends the length of the manifold. At one end of the manifold, the brush rod penetrates the manifold enclosure to receive a hand wheel by which the brush may be rotated to clean such accumulated debris away from the nozzle openings.

Due to the physical size of rotary screen units and where they are located in a waste water treatment plant, manual cleaning may impose unreasonable burdens on the plant operators. Continuous motorized rotation of the brush is also unacceptable due to interference with water flow within the manifold and consequential equipment wear.

It is also desirable that the dislodged debris, much of it being too large to pass through the nozzle orifices, be purged from the manifold interior. For this purpose, a purge valve is provided in the manifold conduit at the opposite axial end from the spray water inlet. When the nozzle cleaning brush is rotated, the purge valve is opened to flush the manifold channel.

At least one supplier of such equipment has integrated the nozzle cleaning brush with the purge valve so that rotation of the brush hand wheel also opens and closes the purge valve. Nevertheless, manual attention and action is required.

It is therefore, an objective of this invention to automate the nozzle cleaning procedure for the screen cleaning shower of a rotary screen thickener.

Another object of the present invention is to provide a selective interval time controller by which a rotary screen thickener cleaning shower may be simultaneously brushed and flushed

SUMMARY OF THE INVENTION

A rotary rod brush is provided along the length axis of a rotary screen thickener cleaning shower manifold. At least one end of the rod brush penetrates the manifold enclosure and is connected to a motor which rotates the rod about its longitudinal axis when the motor is running.

On the opposite end of the manifold from the shower water inlet, a purge pipe is provided with a normally closed solenoid valve.

The brush motor and purge pipe solenoid valve are both energized by a timed controller which determines the period between operating cycles and the length of a cycle. During a cycle, the purge valve is opened and the nozzle cleaning brush rotated.

BRIEF DESCRIPTION OF THE DRAWING

Relative to the drawing wherein like reference characters designate like or similar elements of the invention in both figures of the drawing:

FIG. 1 is an elevational view of a rotary screen thickener having a portion of the outer shell removed to reveal the internal screen cylinder and cleaning manifold.

FIG. 2 is a sectional view of the cleaning manifold taken along the cutting plane II—II of FIG. 1.

DESCRIPTION OF THE PREFERRED EMBODIMENT

Shown by FIG. 1 is a representative rotary screen thickener unit 10 which comprises an outer shell 11 and a cylindrical drum screen 12. The cylindrical screen wall of the drum is secured to a framework 18 which is rotatable about the cylinder axis by motor and transmission unit 13. An influent pipe 14 is flanged to a swivel hub element of the transmission to channel liquified sludge through the outer shell into the drum 12 interior. Not shown is a ribbon helix secured to the internal framework of the drum by which the sludge is advanced axially along the drum length by drum rotation.

At the discharge end of the drum 12, a collection chute 15 penetrates the outer shell 11 to receive the dewatered sludge residual as it falls from the drum interior at a termination boundary 16 of the screen wall.

Within the shell 11 enclosure but externally of drum screen 12 is a shower manifold 20 having a number of shower nozzle assemblies 21 secured thereto. This manifold is connected at one end thereof with a shower water supply pipe 22. A manifold supply pump 24 suction line may draw from a recycle tank not shown or a filtered water source. In the normal case, however, shower water is drawn from a recycle tank which receives filtrate drawn from the outer shell 11 drainage 17.

Coaxially of the shower manifold 20 is a rotary rod brush 26 having radial bristles 27 projecting therefrom in the vicinity of nozzles 21. See FIG. 2. An electric motor and speed reduction unit 28 drives the rod brush 26 rotatively through a fluid-tight packing at the end of manifold 20 opposite from the shower water supply pipe 22 connection. A fluid tee 29 at the same end of manifold 20 as the motor and speed reducer unit 28 connects a drain pipe 30 by which debris brushed from the nozzle orifices is flushed to the sewer system. A normally closed solenoid valve 31 isolates the drain line 30 from the manifold 20 during normal shower intervals.

A programmable logic controller 40 coordinates operation of the brush motor 28 and drain valve 31 to operation of the rotary screen 12. When the screen drive motor 13 is operational, shower water supply pump 22 delivers water into the manifold 20 for cleaning the screen 12. After fifteen minutes of operation, for example, brush rotating motor 28 is started and the manifold drain pipe solenoid valve 31 is opened. Rod brush 26 may be rotated for sixty seconds while flush flow continues through the drain pipe 30. Depending on the length of the manifold 20, flush flow may also be continued for an interval after operation of the rod brush.

Following a cleaning cycle, the drain valve 31 is inactivated to a normally closed position and rod brush 26 rotation is discontinued. In this state, full fluid pressure is restored in the manifold 20 and the nozzles 21 resume their cleaning shower against the screen 12. After another fifteen minute operating interval, the cleaning cycle repeats.

Having fully described our invention, We claim:

1. An apparatus for dewatering aqueous sludge comprising a cylindrical screen that is rotatively driven about the cylindrical axis thereof, fluid conduit means for delivering sludge to the interior of said screen while rotating, a shower manifold extending the substantial length of said screen having shower nozzles depending therefrom for directing a screen cleaning spray of fluid against the exterior of said screen, said manifold having opposed fluid flow inlet and outlet ends and rod brush means extending the internal length of said manifold with bristles in the proximity of each nozzle, brush driving means responsive to external signals for rotating said brush about the rod axis thereof, signal responsive valve means for opening and closing the outlet end of said manifold relative to fluid drain conduit means and programmable controller means for emitting signals to said brush driving means and said valve means on a cyclic time schedule whereby flow obstructing debris accumulated by said nozzles is periodically loosened by said bristles and flushed from said manifold through said fluid drain conduit means.

2. Apparatus as described by claim 1 wherein sludge filtrate passing through said cylindrical screen is supplied to said manifold fluid flow inlet as screen cleaning fluid.

* * * * *